US010184454B2

(12) United States Patent
Monteiro De Barros (10) Patent No.: US 10,184,454 B2
(45) Date of Patent: Jan. 22, 2019

(54) WIND TURBINE FOR GENERATING ELECTRICITY WITH NAVAL TECHNOLOGY (71) Applicant: Marcelo Monteiro De Barros, Rio Claro (BR)

(72) Inventor: Marcelo Monteiro De Barros, Rio Claro (BR)

(73) Assignee: EMBREVEL-EMPRESA BRASILEIRA DE ENERGIA RENOVAVEL LTDA, Recife-Pe (BR)

( * ) Notice: Subject to any disclaimer, the term of this patent is extended or adjusted under 35 U.S.C. 154(b) by 412 days.

(21) Appl. No.: 14/773,158

(22) PCT Filed: Mar. 7, 2014

(86) PCT No.: PCT/BR2014/000084
§ 371 (c)(1),
(2) Date: Sep. 4, 2015

(87) PCT Pub. No.: WO2014/134695
PCT Pub. Date: Sep. 12, 2014

(65) Prior Publication Data
US 2016/0025072 A1    Jan. 28, 2016

(30) Foreign Application Priority Data
Mar. 7, 2013   (BR) .......................... 1020130054968

(51) Int. Cl.
*F03D 9/25*    (2016.01)
*F03D 80/80*   (2016.01)
(Continued)

(52) U.S. Cl.
CPC ................ *F03D 11/02* (2013.01); *F03D 1/06* (2013.01); *F03D 9/25* (2016.05); *F03D 9/257* (2017.02);
(Continued)

(58) Field of Classification Search
CPC . F03D 11/02; F03D 9/25; F03D 15/00; F03D 80/70; F03D 80/88; F03D 1/06;
(Continued)

(56) References Cited

U.S. PATENT DOCUMENTS

| 6,607,464 B1 | 8/2003 | Bauer et al. |
| 2012/0286519 A1 | 11/2012 | Yoon |
| 2013/0008242 A1* | 1/2013 | Sakaguchi ............ F03D 7/0244 73/112.01 |

FOREIGN PATENT DOCUMENTS

| FR | 2944835 | 10/2010 |
| FR | 2944835 A1 * | 10/2010 ............... F03D 9/12 |
| GB | 2256010 | 11/1992 |

OTHER PUBLICATIONS

International Seach Report for PCT/BR2014/000084 dated Jun. 13, 2014.

* cited by examiner

*Primary Examiner* — Phutthiwat Wongwian
*Assistant Examiner* — Kelsey Stanek
(74) *Attorney, Agent, or Firm* — B. Aaron Schulman, Esq.; Stites & Harbison, PLLC (57) ABSTRACT

The present invention relates to a horizontal-shaft/vertical-transmission wind turbine for generating electricity, which may be on-shore or off-shore, with reduced materials and structures in the nacelle, mast and foundation, which moves much of the equipment to the base of the mast, thereby reducing capex, enabling significant reductions in the operation and maintenance costs of the turbines, and reducing the cost of the installed power (installed MW) in a wind farm. The mechanical energy coming from the rotor is transmitted by a vertical shaft system (6) along the mast, which incorporates naval technology, and which is based on platforms (1) to neutralize harmonics and is connected to H/Vst (3) and (Continued)

V/Hmvst (4) transmissions, coupled using contraction and expansion joints (2). In addition to this, the rotor orientation system (YAW control) (29), which is connected to the torque control of the transmissions, the brake control and the blade pitch control, enables the rotor to be properly positioned. The invention enables radio communication between masts and with a control center over an aerial interface, which increases the reliability and general safety of the system.

7 Claims, 6 Drawing Sheets

(51) Int. Cl.
*F03D 11/02* (2006.01)
*F03D 1/06* (2006.01)
*F03D 80/70* (2016.01)
*F03D 15/00* (2016.01)
*F03D 9/11* (2016.01)
*F03D 80/60* (2016.01)

(52) U.S. Cl.
CPC ............. *F03D 15/00* (2016.05); *F03D 80/70* (2016.05); *F03D 80/88* (2016.05); *F03D 9/11* (2016.05); *F03D 80/60* (2016.05); *F05B 2260/403* (2013.01); *Y02E 10/721* (2013.01); *Y02E 10/726* (2013.01)

(58) Field of Classification Search
CPC .... F03D 15/10; F03D 15/20; F05B 2260/403; Y02E 10/721; Y02E 10/726; Y02E 10/725
USPC .............................................. 415/121.3, 123
See application file for complete search history.

WIND TURBINE FOR GENERATING ELECTRICITY WITH NAVAL TECHNOLOGY

FIELD OF INVENTION

The present invention is about a large-sized wind turbine for generation of electric power. The main objective of this document is to present the technical provisions of a large-sized aerogenerator based on the innovative arrangement of its components.

BACKGROUND OF THE INVENTION

The power is the essential basic infrastructure for the human survival and development, and the wind power has the differential of being clean, renewable and with low cost. According to the UN and the international scientific community, we need to make a fast change to an economic model with low carbon emission, which consumes less natural resources, generating less greenhouse gases in its development, thus avoiding the planet heating. In order to guarantee the next generations' future, the technologies for clean and renewable power generation, such as wind, can perform a relevant role in this transition. For these and other reasons, the use of wind power has globally grown in the last five years at very high rates, increasingly representing higher share in the Brazilian and the global energetic matrix.

STATE OF THE ART

The state of the art presents turbines, in which 90% of the equipment is in a Nacelle situated in the upper part of the tower, which provokes exaggerated concentration of mass in this position, in some cases reaching hundreds of tons, which shall be supported at height of more than 120 m and still be able to orient according to the wind direction, in order to use available aerodynamic power at the most.

As the electric power generation system is currently concentrated in Nacelle, there is generation of intensive electromagnetic fields, which impede the operation of the data communication systems via radio among the wind towers (point-to-point and point-to-multipoint radio), so that the current control system may be provided with radios communicating only between the Nacelle and the lower part of the tower itself, for the data exchange to occur on long underground cables, subjected to failures inherent to this type of communication, which is not desirable, especially in emergency situations, where the failure mitigation system shall operate fast and efficiently, avoiding disasters.

Another disadvantage of having the generator and different components used at more than 100 m height is the difficulty to perform periodic maintenance necessary for the good functioning of this kind of equipment, in addition to representing additional risk to the involved workers.

In order to try solving this problem, attempts were made as described in document GB2256010 by C. K. Mong, in which a wind power generation turbine with mechanical transmission to a dynamo located in the base of tower is described; however, it does not contemplate the torque balanced control. In addition to not foreseeing a system for active orientation of the rotor (YAW control), which characterizes a low power machine for electric power generation, and the aerodynamic system identified in the indication (40) is not sufficient to overlay the power to the correct control of the rotor positioning, which results in situations, where it shall be oriented against or in favor of the main shaft rotation direction, which will lead to reduced efficiency of the use of the wind flow mechanical power due to the fact that the rotor is not correctly aligned, which may provoke mechanical failures and in extreme cases, even the breakage of the vertical transmission shaft, among other problems.

In the same way, documents EP1240443 by G. Bauer and G. Berger, and WO2011081401 by J. M. Yoon, try reducing the total weight of the nacelle by means of mechanical transmission of the movement to the tower base, with torque control provided by a differential gear box system with large application in other fields of knowledge, such as, for example, the automobile industry.

These solutions present limitations regarding the maximum power to be transmitted, as while the rotation power transmission occurs, the differential system generates force opposite to the movement, which results in loss of efficiency. In addition, no propeller pitch control systems or brake systems are mentioned. No appropriate means of orientation of the rotor and the gear cooling systems are presented. The lack of such components leads to the conclusion that such kind of solution is applied to turbines with low electric power.

Another relevant fact left aside by the three proposals is the range of mechanical efforts, that a long and slim structure as this suffers: torsion, bending (bending torsion), compression and tensile strength of the vertical shaft on the components, buckling, vibrations and expansions and thermal shrinkage. All these air elastic mechanical distortions result in misalignment and dimensional changes, which will impair the correct functioning of the mechanical power transmission system, either in its global efficiency or due to the excessive wear of parts and components, generating higher need of maintenance, reducing the service life of the system and possible unrepairable damages.

There is no mentioning of the possibility to explore the lack of electromagnetic noise in the Nacelle as well, in order to improve the control systems, communication and safety of the installations, using the wireless communication systems.

The present invention was developed aiming at using latest technology innovative systems in wind equipment for generation of electric power, with the purpose to reduce the value of the installed power (installed MW) in a wind farm, proposing a wind turbine likely to be used in industrial application, quite different from the already known projects, which use vertical transmission along the tower and also transferred big part of the equipment traditionally housed in the Nacelle to the ground.

SUMMARY OF THE INVENTION

The wind turbine for generation of electric power with naval technology, object of the present invention, enables scale gain in the wind designs, thus allowing the increase of the turbine power, without corresponding increase of the whole structure due to the drastic reduction of materials in the Nacelle, in the tower, in the foundation, taking big part of the equipment to the tower base. Thus, by means of its optimized design and its higher economic feasibility, this technology allows achieving higher power than those achieved in conventional wind turbines, with lower cost of installed MW.

BRIEF DESCRIPTION OF THE FIGURES

The attached drawings show the disposition of the wind turbine for generation of electric power with naval technology, object of the present invention, in which the following are shown.

DETAILED DESCRIPTION OF THE FIGURES

Figure 1:
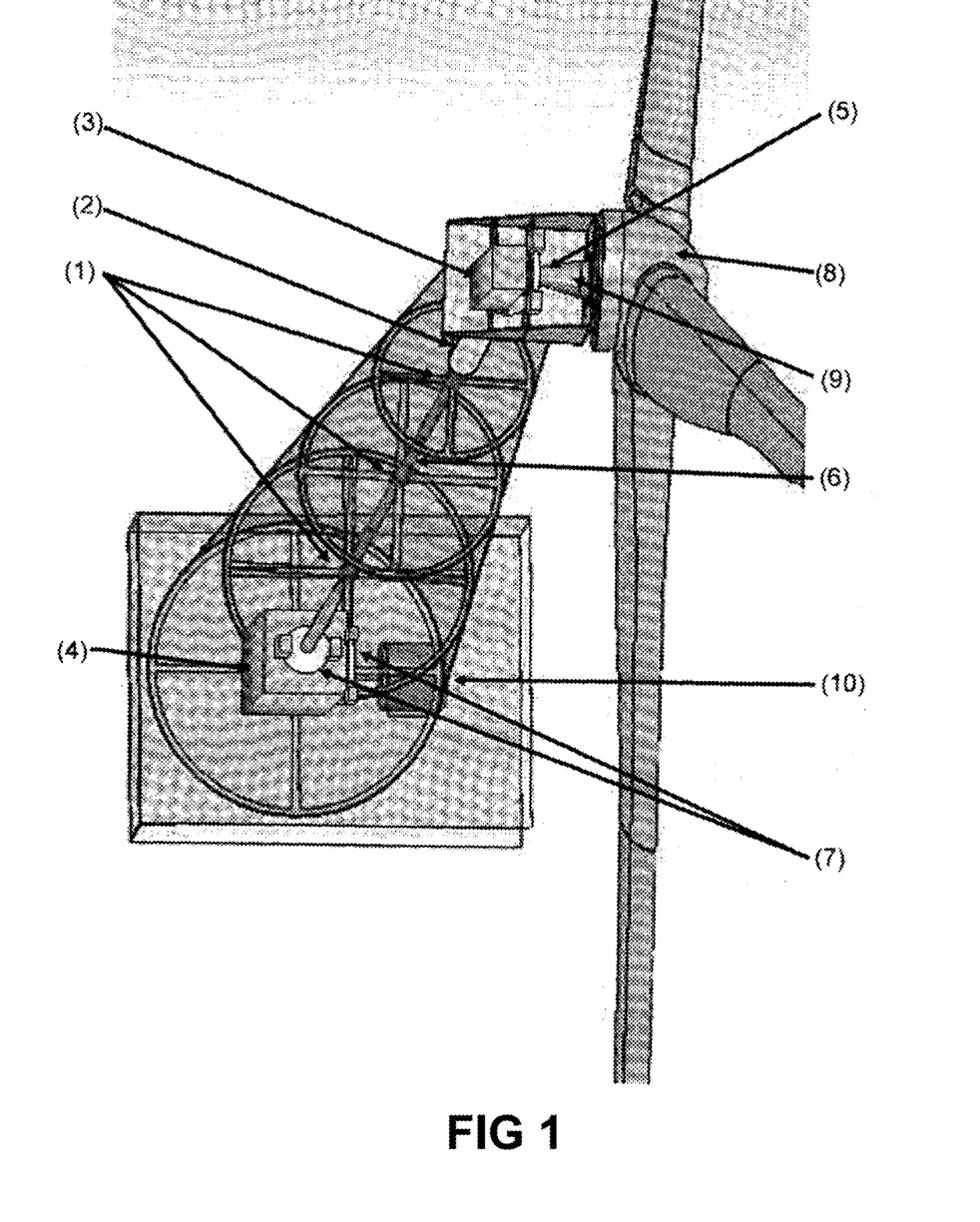
FIG. 1—a higher perspective view with detailing of the transmission of the wind turbine with naval technology.

As presented on FIG. 1, the transmission of the wind turbine consists of: Support platforms (1) of the vertical shaft (6) along the tower over the harmonic points to neutralize the vibrations and the noises, shrinkage and expansion joint (2), that couples the upper transmission system H/Vst (3) to the vertical shaft (6), which adjusts the expansion and thermal shrinkage issues and the structural distortions due to the air elastic forces, upper transmission system H/Vst (3) with torque sensor (Horizontal/Vertical with coupled torque sensor), lower transmission system V/Hmvst (4)—Vertical/Horizontal—with speed multiplication and torque sensor), upper brake disk (5) next to its hydraulic control, mechanical vertical shaft transmission (6) (Shaft line), which uses naval technology, a second set of disk brakes (7)—Lower brake system—that are coupled to the transmission at the tower base, driven by hydraulic clamps, whose hydraulic control system is close to this system, propeller pitch control (8), main shaft (9), Generator (10).

Figure 2:
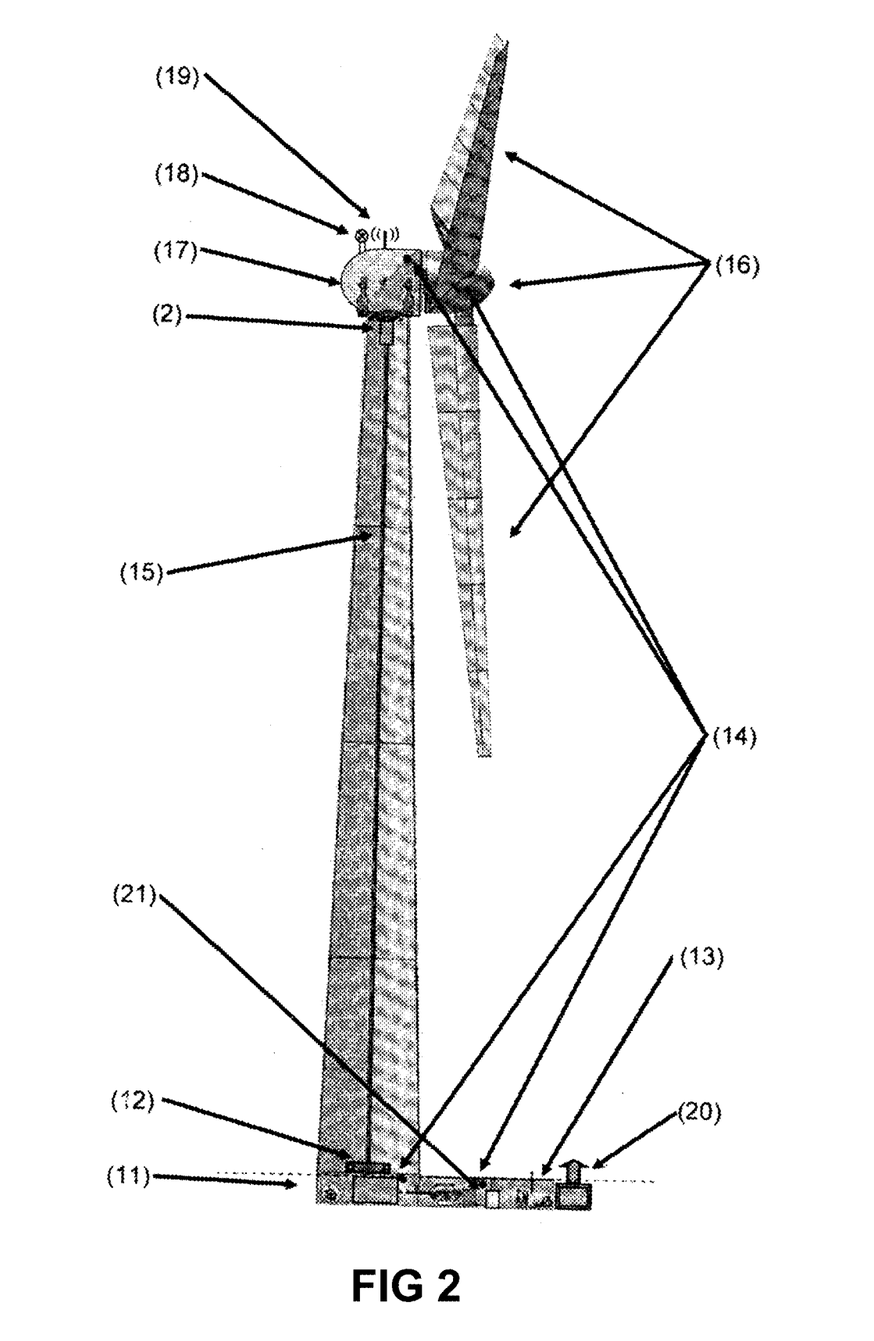
FIG. 2—a general view of the wind turbine in cross section.

FIG. 2 presents a general view of the wind turbine in cross section. An underground Bunker (11) can be seen there (on the ground), which is connected to a concrete foundation or "monopile", axial bearing for the vertical shaft (12) sustaining, a diesel generating set (13), firefighting system (14), low friction couplings of the vertical shaft (15), rotor (16), Nacelle with YAW control (17), anemometric tower (18), antenna (19) of the "Tele supervision radio inter-communicator Spark", refrigeration fluid cooling tower (20), control cabinet (21).

Figure 3:
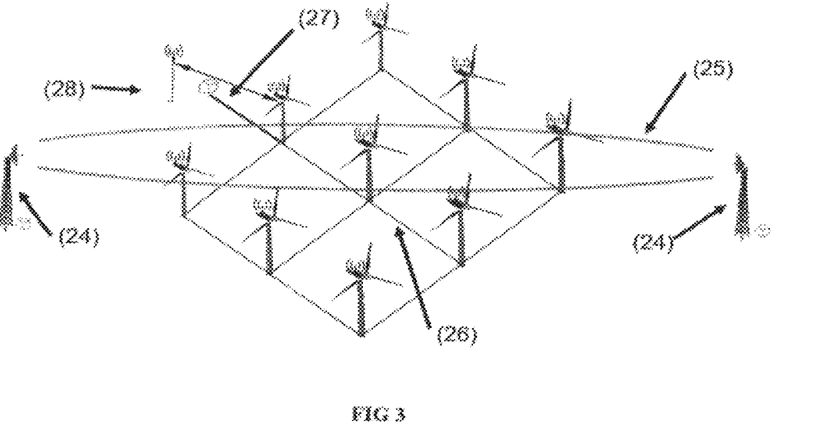
FIG. 3—a view of the wind farm with the air interface of the "Radio Tele Supervision Inter-communicator Spark" functioning.

FIG. 3 presents a view of the wind farm with the air interface of the "Tele supervision radio inter-communicator Spark" functioning. The air interface of the "Tele supervision radio inter-communicator Spark" consists of radio antennas (19) installed in each turbine, which communicate in among the other towers, these towers communicated with an information concentrating tower (28), that exchanges information with the control center (27), located in the control cabinet (21) in the Bunker, with a direct connection to the center (27) (point-to-point radio) and with one more redundancy, as well, using a radio equal to the turbines', the wind turbines in question allow the passage of a signal from the telecommunication operators (telephone, TV, AM and FM radio) (24), allowing the crossing of the radio signal (25) within the wind farm, the physical means of data exchange (data cables) consist of connections (26), which concentrate this physical means of data exchange until the radio center (27). The arrangement of the turbines is only illustrative to explain the radio system and not the perfect conditions of positioning of the machines in a wind farm.

Figure 4:
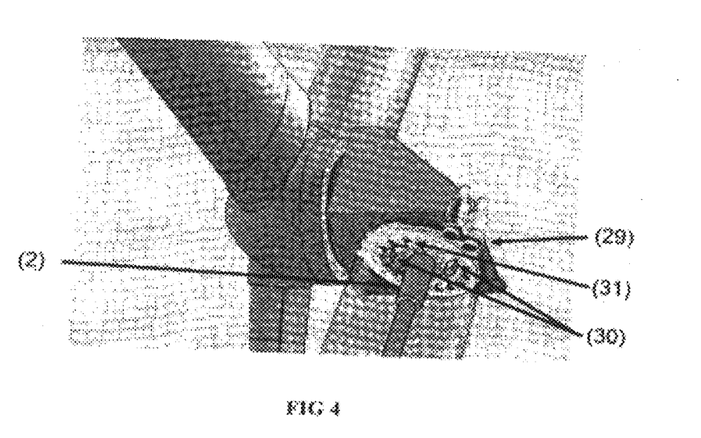
FIG. 4—a detailed lower view of the "YAW Drive System for Self-Locking Servo-positioner Spark".

FIG. 4 displays in detail the "YAW Drive System for Self-Locking Servo-positioner Spark", which comprehends a YAW drive control system (29), electro-mechanical and/or hydraulic systems for locking (30), hydraulic brake systems (31), "shrinkage and expansion joint" (2).

Figure 5:
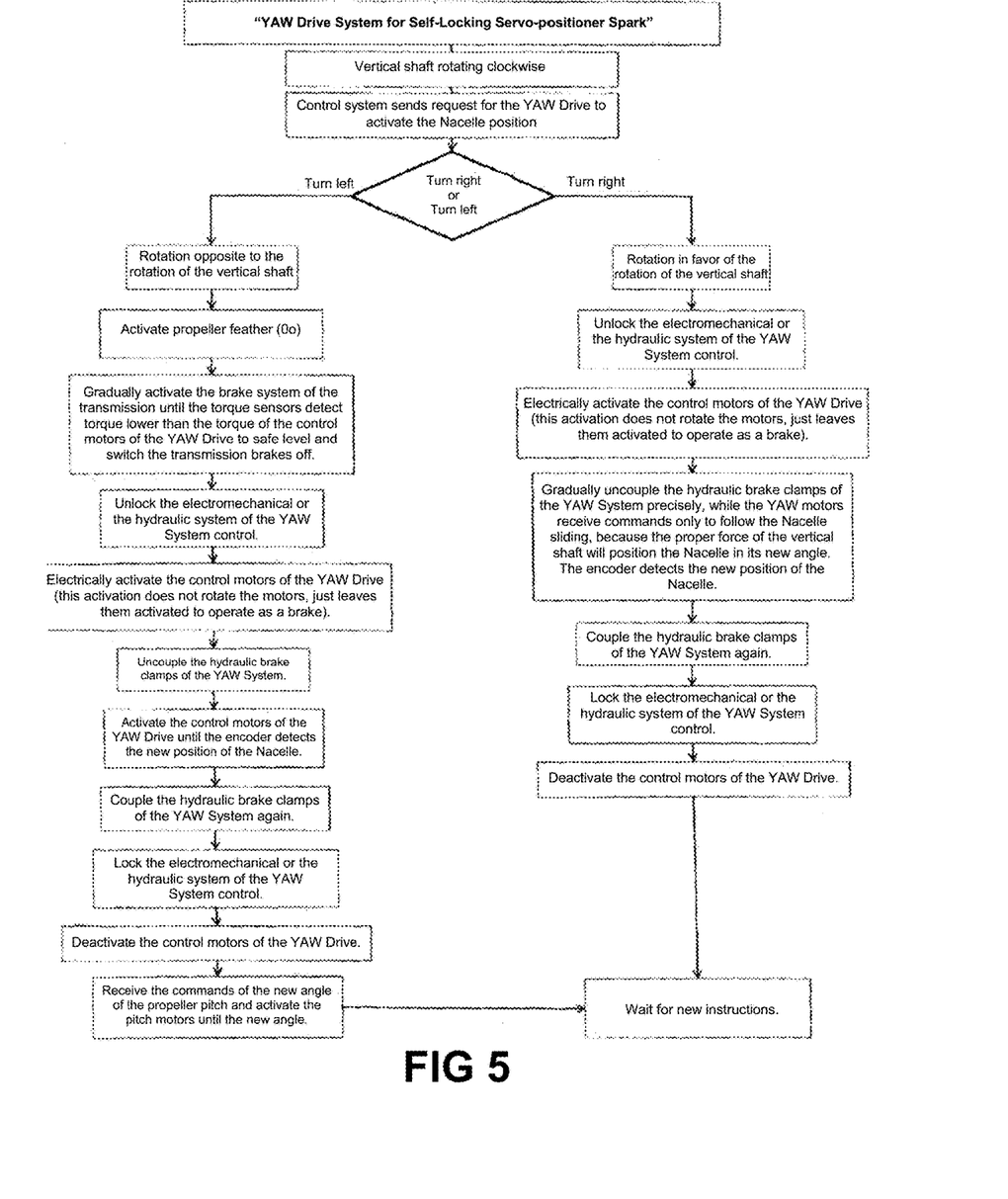
FIG. 5—a basic functioning flow chart of the "YAW Drive System for Self-Locking Servo-positioner Spark".
Figure 6:
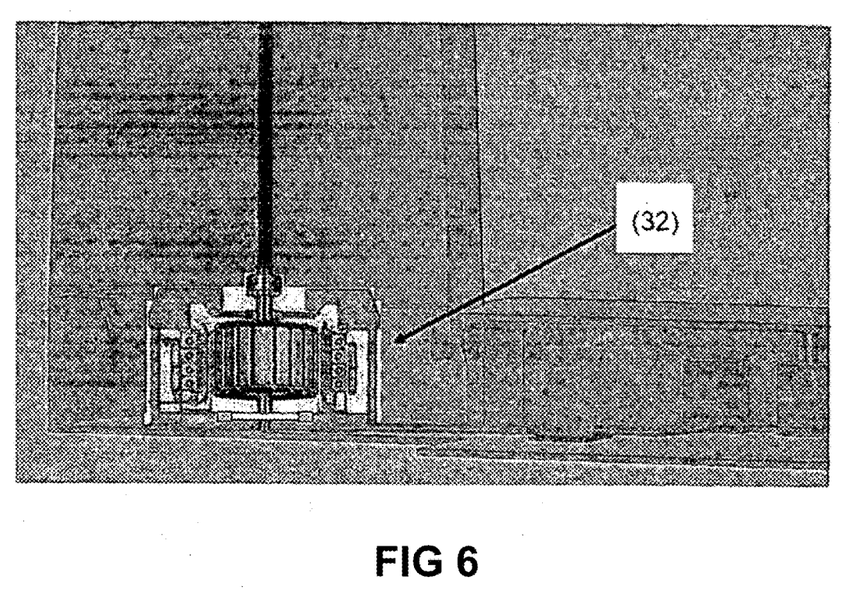
FIG. 6—a cross section View with detailing of the bunker with direct drive generator.

FIG. 5 presents the Flow chart of the "YAW Drive System for Self-Locking Servo-positioner Spark" consisted in basic logics of the system operation.

DETAILED DESCRIPTION OF THE INVENTION

The wind turbine with horizontal shaft and vertical transmission, object of the present invention, uses the force of the wind to drive an active Axial multi-blade rotor (16), which changes the pitch of such propellers (Hub with active propeller pitch control), and which communicates with a meteorological station close to the Rotor to use the wind better and brakes as well, taking the attack angle to zero degrees (propeller feather), or negative angle, to brake the turbine (force, opposite to the rotation direction). This rotor is fixed to a main shaft (9), which is supported by a reinforced Skid (main frame) to sustain the whole Rotor, and is provided with bearing housings with special bearings to neutralize the axial forces present in this region of the machine, and sustain the whole rotor assembly adequately. These bearings are provided with lubricating oil-pumping systems.

Coupled to the main shaft, there is a brake disc (5) (Upper braking system), driven by hydraulic clamps, whose upper hydraulic control system is fixed to the Skid (main frame). The Skid in question is provided with gearmotors (YAW Drive System) responsible for the control of the positioning of the whole upper structure, in a way to position the rotor perpendicularly to the wind incidence (there is front incidence of winds on the propellers on our machine (Upwind)). This Skid is fixed to a special big-sized bearing (this bearing is provided with a ring gear, which enables the gearmotors and their gear pinions to rotate the whole upper assembly mechanically), that in turn, couples the whole upper assembly to the wind turbine sustaining tower. The common name of this upper assembly between the rotor and the tower is called Nacelle (17), as mentioned in the beginning of this document, which houses all items mentioned above.

Other items, which are also parts of our machine, are the grounding systems (brushes, wire ropes, cables, etc.), control cables, electric feeding cables, general sensors, encoders (positioning sensors), rotor housing and nacelle housing fairing (17), batteries, capacitors, appropriate firefighting system (14), "tele supervision radio inter-communicator Spark" (radio for communication among the turbine in the farm, which will be better explained here below), guard light, general lighting, upper control center and anemometric station (18). Part of the items mentioned above are already parts of the state of the technique, despite of being structurally lighter, it is important to mention them, because each of these items is a part of the wind turbine with horizontal shaft and vertical transmission of the patent in question and all differentiated details, and of inventive character, will be presented below.

As mentioned before, the rotor (16) is connected to a main shaft (9), and this shaft is connected to an upper transmission system H/Vst (3) with torque sensor (Horizontal/Vertical with coupled torque sensor). This transmission enables higher rotation torques from the horizontal direction to the Vertical direction. This transmission system H/Vst (3) is positioned in the Nacelle Skid (17) (Main frame), exactly in the upper center of the tower (in the center of the connection between the Nacelle (17) and the tower). This H/Vst transmission transmits the rotor torque to the vertical shaft (torque tube or Shaft line) at winds from 3 m/s, and the latter mechanically transmits the rotor power to the lower part of the tower to the lower transmission system V/Hmvst (4) (Horizontal/Vertical with speed multiplication and torque sensor), which in turn takes the transmission RMP to the perfect conditions for electric power generation, and is coupled to one or more generators (32), of adequate models for the torque curve of the machine(s) installed in the lower part of the tower or inside an underground Bunker (11) (on the ground), which is connected to concrete foundation or "monopile", which will be further explained better.

The vertical shaft (6) may also be connected to a Direct Drive system, which connects to a multi-pole generator in the tower base. The vertical shaft (6) is provided with naval technology known as "Motor Shaft Line".

Such shaft can transmit more than 100 MW power at more than 120 m distance. The present invention uses the naval engineering to develop this vertical shaft in the wind turbine tower, a fact, which has not been seen in this industry yet.

Support platforms (1) are used along the tower, because as all dynamic devices, this vertical shaft (6) (Shaft line) causes vibrations, and therefore, there are harmonics, which shall be neutralized for the perfect functioning of a structure with this size.

These support platforms (1) along the tower are strategically placed at harmonic points of the vertical shaft (6) (Shaft Line), because the tower is not static; as in a large-sized ship, the tower is subjected to different forces, such as, for example: air elastic, buckling and bending and torsion, among others. This is due to the wind loads on the tower itself and on the rotor, thus, these platforms are indispensable to neutralize the vibrations and the noises on the vertical shaft, phenomena, whose lack of control makes the design unfeasible.

The support platforms (1) in question are not necessarily installed symmetrically far one from the other, because they will vary according to the harmonic points, RPM and the turbine power. Between platform (1) and the vertical shaft (6), there are low-friction couplings to reduce loss of these supports, which are of the hinge type, for fast and easy maintenance.

With the temperature variance, metals trends to expand or shrink. The tower expansion and shrinkage are not the same as those of the Vertical shaft (6). In order to solve such issue, an "expansion and shrinkage joint" (2) was developed, which couples the upper transmission system H/Vst (3) to the Vertical shaft (6), which adjusts the thermal expansion issues of the structure, eliminating the damages caused by this natural phenomenon.

This joint (2) also helps in the structural variances caused by the air elastic efforts on the structure. The Vertical shaft (6) is self-sustaining, because the whole weight of this structure is sustained by an axial bearing at the tower base, considering that it can also be an electromagnetic repulsion coupling, thus neutralizing the weight load pm the Nacelle (17) and at the other points of the tower structure. This point will be acoustically isolated at the tower base.

The transmission of the power generated by the wind depends on the common functioning of all components of the wind turbine object of this invention, composed of a Main shaft (9), an upper transmission system H/Vst (3) (Horizontal/Vertical with torque sensor), which has a hydraulic brake disc (5) between these components, this transmission connects to the adjustable coupling system "expansion and shrinkage joint" (2), which works according to expansion, thermal shrinkage and possible structural movements (due to the air elastic efforts), connected to the Vertical shaft (6), which is provided with support platforms (1) to neutralize the harmonic vibrations and is self-sustaining to eliminate load on the structure, supported by an axial bearing in an acoustically isolated location, coupled to a lower transmission system V/Hmvst (4) (Vertical/horizontal with speed multiplication and torque sensor), which increases the rotation speed of the system, in order to keep the generator (32) in the best possible yield condition.

A second set of disc brakes (lower braking system) is coupled to the transmission at the tower base, driven by hydraulic clamps, whose hydraulic control system is situated close to this system.

This transmission was developed to withstand all conditions of a wind turbine, such as, blow winds (sudden impact on the turbine), storms (very strong winds, rain and lightning bolts), constant winds and winds with variable direction.

The brake electronic control center of this transmission sends information (signals) to the brake clamp control hydraulic systems, informing the braking intensity conditions, and perfectly controlling the deceleration ramp of the whole transmission safely under any condition that requires braking of the wind turbine in question.

The position and the torque sensors coupled to the upper and the lower transmission (upper transmission H/Vst (3) and lower transmission V/Hmvst (4)) send signals to the brake controls, which control the braking of the whole transmission safely, avoiding excessive impact on the Vertical shaft (6), and on the upper (3) and the lower (4) transmissions. The propeller pitch control also communicates with this system for the perfect balance of the whole system.

In a wind turbine with horizontal shaft and axial shaft line transmission, there is one critical issue, which is the torsion strength transmitted to the Nacelle (17), when the rotor is rotating at upper transmission H/Vst (3), which in turn rotates the vertical shaft (6).

This rotation force trends to rotate the whole Nacelle (17), in the direction opposite to the vertical shaft (6) movement. As mentioned before, the Nacelle (17) in question is provided with gearmotors fixed to the Skid (Main Frame), responsible for the control of the positioning of the whole upper structure (YAW Drive), in order to position the rotor (16) perpendicularly to the wind incidence, reminding such movement might occur while the rotor is rotating.

To solve this issue, the "YAW Drive System for Self-Locking Servo-positioner Spark" was developed. This system enables the azimuth control (positioning of the Nacelle (17) for the rotor to fall upon perpendicularly to the wind (YAW Drive system)), while the vertical shaft (6) applies a force opposite, or favorable, to the Nacelle (17) movement, for the rotor to be correctly positioned to the wind incidence.

The rotor positioning in relation to the wind can be exemplified in the following way: if the vertical shaft is turned clockwise and the Nacelle has to turn to the right, the "YAW Drive System for Self-Locking Servo-positioner Spark" will position the Nacelle in favor to the vertical shaft movement and if the Nacelle has to turn to the left, the "YAW Drive System for Self-Locking Servo-positioner Spark" will position the Nacelle in direction opposite to the vertical shaft movement.

One or more encoders (angular positioning sensors) will help in the execution of this task. The differential of the system proposed now is the electromechanical or hydraulic lock of the YAW control and the logics of operation of these components, as it can be seen on FIGS. 4 and 5.

The present invention proposes transfer of big part of the equipment traditionally housed in the Nacelle (1) to the ground (in case of onshore machines, but the turbines can also be offshore and the machine house can be situated close to the water level) building a machine house, containing all equipment necessary for the electric power generation:

- housing for accommodation of the vertical shaft (shaft line housing), where there is one big-sized axial bearing acoustically isolated,
- the transmission system V/Hmvst, which multiplies the rotation at correct RPM for the generation of electric power in electromagnetic induction generators;
- the lubricating oil pumping systems of the bearings;
- elastic or hard couplings;
- hydraulic brake system and its hydraulic control system;
- one or more induction generators (it can also be a multi-pole direct drive generator (connected directly to the vertical shaft));
- skids for the components fixing (bases);
- cabinet of the generator control system (which can activate and deactivate the poles to improve the power generation according to the wind intensity);
- cabinet of the system for the machine general control (mechatronic controls);
- PLC's (programmable logic controller);
- controls of the anemometric station (data logger, remote analysis interface) and all controls and receivers of the machine sensors).
- control center of the "tele supervision radio inter-communicator Spark";
- battery bank (no break);
- diesel generating set (activated in case there is lack of energy);
- firefighting system appropriate for this type of machine house with all necessary sensors (many wind turbines get on fire due to series of reasons and there is no way to control these accidents at the top of the tower);
- remote management system (Integrated wind farm management, CMS (Content Management System) basically a programming unit);
- grounding systems;
- emergency button;
- electric ducts;
- alarms;
- lighting;
- surveillance cameras;
- one or more refrigeration fluid cooling towers (cooler for refrigeration of any heated component, such as the generator and the transmissions, for example);
- transformer or transformers;
- electric and data cables;
- PDP (power distribution panel);
- GDP (general distribution panel), among others.

The whole structure of the machine house presented above can be situated next to the tower base or in an "Underground Bunker" (11), which is connected to concrete foundation or "monopile". This concrete Bunker is under the ground level and all equipment are arranged conveniently spaced, distributed (correct division among components) in thermally controlled and acoustically isolated environments (room divisions can be contemplated).

This Bunker will be provided with a draining system, which will not allow water penetration, ventilation system, anti-mold painting and conditions much more convenient for the workers.

Another advantage of this Bunker is that it will not cause atmospheric turbulence in the wind farm, preserving the aerodynamic characteristics of the wind turbine in question, allowing the use of analysis software, which defines the turbine positioning in the wind farm; this is a great economic advantage, because we will be able to use already existing traditional software.

In case replacement of any component in the machine house is necessary, it will be on the ground, there will be no need to use big cranes. With this solution, safer night works are also enabled. As already mentioned, we have big O&M advantages.

Another benefit of bringing the Nacelle (17) to the ground is that the Direct Drive technology (multi-pole generator, with no need of multiplication box) can be used and positioned in a condition similar to that in some water power plants.

When the generators are installed on the Nacelle (17), on the top of the tower (as in the current wind turbines), they generate a big electromagnetic field, impeding the crossing of the radio communication systems. Thanks to the benefits proposed by the present invention (free Magnetic field); the wind turbine may be provided with a "tele supervision ratio inter-communicator system Spark". This is a communication radio, which can be installed in each of the turbines in the farm, or in a remotely controlled center.

This radio system enables all turbines to communicate in between through RF signals in an airborne interface, as mentioned above, and to take decisions independent from human action, such as, for example, if a turbine changes its YAW (change the azimuth) and none of the others do so, this turbine will be questioned about the reason for such action, if it does not respond with an acceptable reason, alarm will be triggered on it and a communication will be send to the operator instantly.

Depending on the action a turbine takes, it may even be deactivated, activating the safety brake and placing its propeller in feather without presence of men, as in the case when the safety RPM limit is exceeded, the blade tip speed is exceeded, or any action, which might compromise the machine (the other machines will check a database to take this action). This system is called "the lost sheep system".

The turbines may also question the operators about the best decisions to be taken, check whether the database shall be accessed for active or predictive action. For example, active action occurs when the machine replies immediately or with a delay, to the action indicated by the anemometric station installed on each machine. Predictive action occurs, when the machine actions are basically associated to pre-determined database.

All these systems are also present in the physical data communication system. "The tele supervision radio inter-communicator system Spark" may also serve as redundancy, in case there is any failure in the data system.

Another advantage of the absence of a generator on the top of the tower is that there will be no electric discharge, which damages the bearing (welding by voltaic arc). Currently, expensive ceramic bearings (Si3N4) are used (from 2 to 5 times more expensive than the traditional ones), which electrically insulate the core of these bearings to avoid damages by the generation of a voltaic arc.

The transmission system H/Vst (3), as mentioned before, has the function to transmit high force from the rotor to the vertical shaft (6). This system was designed to have a long service life, and can be presented as a system of precision gears aligned in a closed transmission box, sunk in oil, which is in constant movement by means of a circulation and filtering pump. A radiator with ventilated cooling fluid may also be installed, in case this turbine is in a very hot region. The same condition applies to the transmission system V/Hmvst (4). Reminding also that these transmissions are provided with position, torque and temperature sensors, which exchange information with the control centers, such as those of the brake systems and the propeller pitch control.

PREFERRED EMBODIMENT

According to the present invention, the developed wind turbine with horizontal shaft and vertical transmission has the following characteristics:

a) One wind turbine with vertical shaft, which can be onshore or offshore, with focus on the general structural reduction due to the drastic reduction of materials in the Nacelle (17), in the tower and in the foundation, providing capex reduction bringing new and significant cost reductions in the turbine operation and maintenance, reducing the value of the installed power (installed MS) in a wind farm. Presenting inventiveness and a fully operable concept in the industry compared to the previous patent petitions (GB2256010; EP1240443 and WO2011081401), which also use vertical shaft mechanical transmission to bring the Nacelle (17) components to the ground. As we have a lighter Nacelle (17), we insert our machine in lower frequency spectrum due to the lower compression strength, this phenomenon benefits the structural impedance conditions. A central and extremely important issue of this technology is that it allows scale gain in the wind designs, thus allowing increase of the turbine power without the corresponding increase of the whole structure. Thus, with this technology, it will be possible to achieve power, which has never been achieved before in wind turbines, taking the cost of installed MW to values, which have never been imagined before.

b) The vertical shaft (6) has naval technology able to transmit power of more than 100 MW at more than 120 m distance. For the wind turbine design, support platforms (1) along the tower were contemplated at harmonic points to neutralize the vibrations and the noise. Inside the Nacelle (17), there is a sophisticated upper transmission system H/Vst (3) with torque sensor coupled to a "shrinkage and expansion joint" (2), which adjusts the issues of air elastic mechanical and thermal expansion and shrinkage deformation of the structure, allowing the transmission of the rotor power (16) from the horizontal to the vertical condition. This vertical shaft (6) is sustained by an axial bearing at the tower base to neutralize the load on the Nacelle (17) and the tower. The same vertical shaft (6) connects to a lower transmission system V/Hmvst (4) (Vertical/Horizontal with speed multiplication and torque sensor), which transmits the power from the rotor (16) to one or more induction generators (32) on the ground (or a bunker), and which can also be a generator connected directly to the vertical shaft (6), known as "direct drive" (multi-pole generator, with no need of multiplication box), positioned in a condition similar to that in some water power plants. This transmission as a whole is provided with a sophisticated brakes system, one inside the Nacelle (17) and others close to the ground. The control centers of these brakes receive signals from different points (torque sensors, RMP, position, propeller pitch sensors, among others) to control the braking intensity perfectly, in a deceleration ramp safely under any condition, which requires braking of the wind turbine, avoiding excessive impact on the vertical shaft (6) and on the upper (3) and the lower (4) transmissions.

c) Close to the anemometric tower (18), on the Nacelle (17), there is an antenna (19) of the "Tele supervision radio inter-communicator Spark", which allows all turbines to communicate in between, through radio frequency in an airborne interface, functioning as an artificial intelligence system, and serve as redundancy of the control system, with safety systems, and one of them is called "lost sheep system". As there will be no electromagnetic fields in the Nacelle (17), it is possible for radio signals to cross the wind farm. We will also not use ceramic bearings, because there will be no electric discharge, thus we can use the traditional low cost bearings. A firefighting system (14) is installed on the tower and in the machine house close to the ground. Between the Nacelle (17) and the tower, there is the "YAW Drive system for Self-locking Servo-positioner Spark", which solves the critical issue that the vertical shaft causes on the positioning of the YAW control, which can be viewed on FIGS. 4 and 5.

d) The machine house can be in the tower base or in an "Underground Bunker" (11), this concrete Bunker is under the ground level and all equipment is arranged in a more optimized way. Another advantage of this Bunker is that it will not cause atmospheric turbulence in the farm, enabling the use of the current analysis software, which defines the positioning of the turbines in the wind farm. As we have more space in this new condition, we can have a better-equipped aerogenerator, with bigger battery bank (no break), a diesel generating set, a firefighting system, alarms, lighting, surveillance cameras, refrigeration fluid cooling towers, among others.

Figure 7:
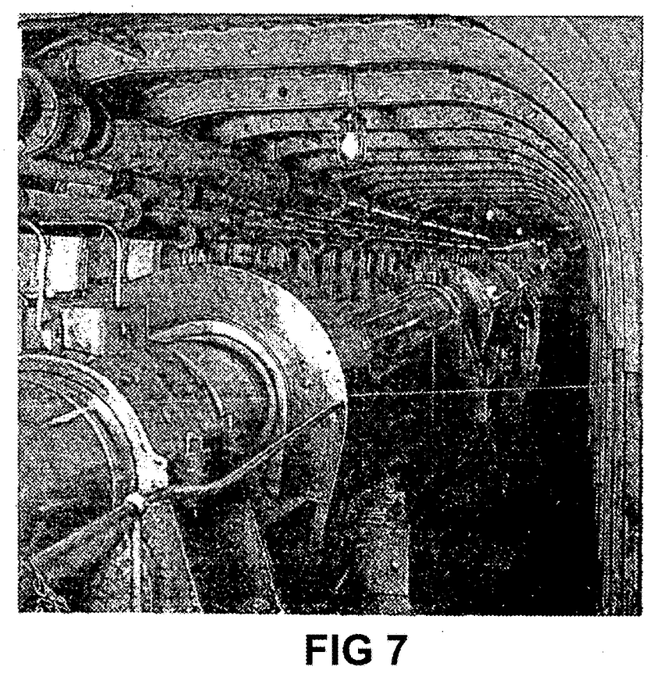
FIG. 7—a "shaft line" of a large-sized ship.
Figure 8:
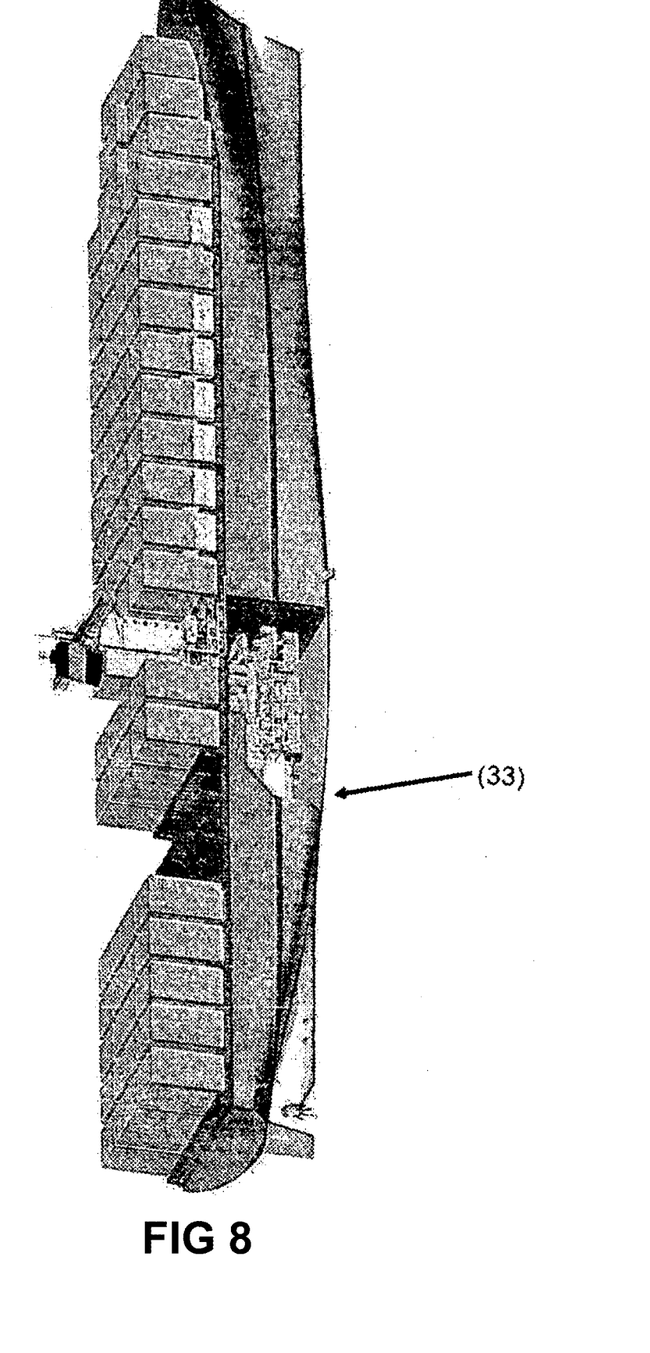
FIG. 8—a general view of the transmission of a large-sized container ship with "motor shaft line" technology.

The current large-sized wind turbines are developed with the multi-functional concepts of different engineering areas, one of the innovations of the present invention is adding the naval engineering to the design of the turbine in question (FIGS. 7 and 8), which enables transmitting high power by means of a naval shaft "motor shaft line".

The invention claimed is:

1. A wind turbine comprising a low weight nacelle, a tower, a vertical shaft, a generator, a concrete foundation, and a control center, wherein said components are arranged in a manner such that:
  a) the nacelle is connected in an upper part of the tower, and comprises the following elements:
    i. a multi-blade axial rotor moved by a force of a wind on blades and placed perpendicularly to a wind incidence, connected to the vertical shaft on an inside of the tower and supported by a skid;
    ii. an upper transmission system H/Vst provided with a torque sensor, a position sensor and an active control system to change a propeller pitch according to the wind incidence, coupled to the vertical shaft in a center of the connection between the nacelle and the upper part of the tower, which mechanically transmits a power from the multi-blade axial rotor to the vertical shaft;
    iii. an upper brake system, coupled to an upper end of the vertical shaft with a hydraulic brake disc driven by hydraulic clamps, wherein a hydraulic control system of the upper brake system is fixed on the skid;
  b) the tower, which supports the nacelle and its components and accommodating the vertical shaft;
  c) the vertical shaft, of a motor shaft line type, which extends along the inside of the tower to connect to the generator, the vertical shaft being provided with:

i. a multiplicity of support platforms provided with a multiplicity of low friction elastic coupling and shrinkage/expansion joints, which are positioned at a multiplicity of harmonic vibration generation points of the vertical shaft, determined according to operational conditions such as, rotation speed of the blades, motor power, tower height, and temperature;

ii. a multiplicity of sustaining bearings located in a lower end of the vertical shaft, which support a weight of the vertical shaft structure;

iii. a lower transmission system V/Hmvst provided with a torque sensor, a position sensor and with speed multiplication, which increases the rotation speed of the vertical shaft to generate power;

iv. a lower brake system, driven by a multiplicity of hydraulic clamps;

d) the generator, on which the lower end of the vertical shaft is connected, installed in a lower part of the tower, in the concrete foundation positioned on a ground or underground; and e) the control center situated in a base of the tower inside the concrete foundation, receiving information from an active electronic control with a dedicated software, installed in the upper part of the tower, which performs measurements of a torque and direction of the wind and drives the upper and the lower brake systems and the hydraulic control system.

2. The wind turbine, according to claim 1, characterized by a power transmission assembly comprising:

the vertical shaft;

the upper transmission system H/Vst provided with the torque sensor, a wind direction sensor and the upper brake system;

an adjustable coupling system comprising the shrinkage/expansion joints;

the support platforms located at the harmonic vibration generation points;

the lower transmission system V/Hmvst having the torque sensor and a rotation speed multiplier and the torque sensor;

the lower brake system coupled to the lower transmission system at the base of the tower, driven by the hydraulic clamps; and the upper and the lower brake systems.

3. The wind turbine, according to claim 1, characterized by the control center controlling braking of the upper and lower transmission systems, preventing excessive impact on the vertical shaft due to deceleration effects, comprising the following stages:

checking signals sent by the torque and the position sensors coupled to the upper and the lower transmission systems;

comparing the signals to information obtained from the position and torque sensors and identifying a need for activating the upper and lower brake systems according to a speed and a direction of the wind;

controlling and adjusting the propeller pitch; and sending information to the hydraulic systems, controlling the hydraulic clamps.

4. The wind turbine, according to claim 1, characterized by a rotor positioning system configured to act according to a rotation direction of the vertical shaft and an intended positioning of the rotor.

5. The wind turbine, according to claim 1, characterized by the upper transmission system transmitting a rotor torque during winds having a velocity greater than 3 m/s.

6. The wind turbine, according to claim 1, characterized by the vertical shaft being able to transmit power over 100 MW at more than 120 meters distance, with reduction of structures in the nacelle.

7. The wind turbine, according to claim 1, characterized by the control center, situated at the base of the tower, comprising at least the following equipment:

a housing for accommodation of the vertical shaft, having sustaining bearings having an acoustic isolation;

the lower transmission system V/Hmvst, which multiplies a rotation of a vertical axis at a correct RPM for a generation of electric power in electromagnetic induction generating sets;

a lubricating oil pumping system of the sustaining bearings;

elastic couplings;

the lower brake system and its hydraulic control system;

the induction generating sets or a multi-pole direct drive generator, connected directly to the vertical shaft;

the skids;

a cabinet for a control system of the generator;

a cabinet for a general control system of the wind turbine;

a programmable logic controller;

a control of an anemometric station;

a battery bank;

a diesel generating set activated when there is a lack of energy;

a firefighting system;

a remote management system;

grounding systems;

an emergency button;

electric ducts;

alarms;

lighting;

surveillance cameras;

one or more refrigeration fluid cooling towers;

at least one transformer;

electric and data cables;

a power distribution panel; and a general distribution panel.

* * * * *